United States Patent
Chen et al.

(10) Patent No.: US 7,042,656 B2
(45) Date of Patent: May 9, 2006

(54) COMPACT WIDE-FIELD-OF-VIEW IMAGING OPTICAL SYSTEM

(75) Inventors: Chungte W. Chen, Irvine, CA (US); J. Steven Anderson, Santa Monica, CA (US)

(73) Assignee: Raytheon Company, Waltham, MA (US)

( * ) Notice: Subject to any disclaimer, the term of this patent is extended or adjusted under 35 U.S.C. 154(b) by 89 days.

(21) Appl. No.: 10/429,103

(22) Filed: May 1, 2003

(65) Prior Publication Data

US 2004/0218284 A1    Nov. 4, 2004

(51) Int. Cl.
G02B 13/18    (2006.01)
G02B 13/14    (2006.01)

(52) U.S. Cl. ..................... 359/716; 359/356
(58) Field of Classification Search ................ 359/709, 359/716, 350, 356
See application file for complete search history.

(56) References Cited

U.S. PATENT DOCUMENTS

| | | | |
|---|---|---|---|
| 3,944,337 A | | 3/1976 | Ruben |
| 4,109,995 A | * | 8/1978 | Betensky ................. 359/716 |
| 4,300,817 A | * | 11/1981 | Betensky ................. 359/651 |
| 4,494,819 A | * | 1/1985 | Lidwell ................... 359/356 |
| 5,251,063 A | * | 10/1993 | Baumann ................. 359/355 |
| 5,493,441 A | * | 2/1996 | Chipper .................. 359/354 |
| 5,502,592 A | | 3/1996 | Jamieson |
| 6,154,245 A | * | 11/2000 | Kato ...................... 347/244 |
| 6,292,293 B1 | | 9/2001 | Chipper |
| 6,356,396 B1 | * | 3/2002 | Chen et al. .............. 359/711 |
| 6,414,802 B1 | | 7/2002 | Betensky |

* cited by examiner

Primary Examiner—Scott J. Sugarman
(74) Attorney, Agent, or Firm—John E. Gunther; Leonard A. Alkov; Karl A. Vick

(57) ABSTRACT

An imaging optical system has an optical axis and a refractive optical group including a lens lying on the optical axis. At least one lens of the refractive optical group lying on the optical axis has an aspheric front surface and an aspheric back surface. An image surface lies on the optical axis, and the refractive optical group forms an image at the image surface. The image surface is preferably substantially planar. A detector, such as a focal plane array detector, lies on the optical axis such that a ray of light passing through the lens is incident upon the detector. It is preferred that there are two lenses lying on the optical axis, with each lens having an aspheric front surface and an aspheric back surface. The imaging optical system is suitable for use as a large-aperture, wide-field-of-view, compact system having an F number of less than about F/1.5, a field of view of more than about 45 degrees, and a telephoto ratio of less than about 2.0.

21 Claims, 4 Drawing Sheets

FIG. 5

| ELEMENT | RADIUS OF CURVATURE | | THICKNESS | APERTURE DIAMETER | |
|---|---|---|---|---|---|
| | FRONT | BACK | | FRONT | BACK |
| OBJECT | INF | | INFINITY | 1.5394 | |
| FIRST LENS | A(1) | A(2) | 0.4675 | 0.9476 | 0.8321 |
| | | | 0.1156 | | |
| | | | 0.3376 | | |
| APERTURE | | | APERTURE STOP | 0.6173 | |
| | | | 0.0727 | | |
| SECOND LENS | A(3) | A(4) | 0.1156 | 0.8090 | 0.8090 |
| | | | 0.2049 | | |
| THIRD LENS | -1.2549 | A(5) | 0.0925 | 0.8090 | 0.8090 |
| | | | 0.5127 | | |
| DETECTOR | INF | INF | 0.0370 | 1.0401 | 1.0401 |
| | | | 0.0139 | | |
| IMAGE | IMAGE DISTANCE INF | | INF | 1.0401 | |

| ASPHERIC | CURVATURE C | k | A | B | C | D |
|---|---|---|---|---|---|---|
| A(1) | 1.54232369 | 0.013474 | -9.46306×10⁻⁰³ | 2.66275×10⁻⁰¹ | -5.98197×10⁺⁰⁰ | 3.77765×10⁺⁰⁰ |
| A(2) | 1.70109128 | -0.247665 | 2.46218×10⁻⁰¹ | 1.62817×10⁻⁰⁰ | -2.13161×10⁻⁰¹ | 5.06595×10⁺⁰¹ |
| A(3) | 0.89098889 | 1.7127/8 | 1.29822×10⁻⁰¹ | -7.13255×10⁻⁰¹ | -2.45011×10⁺⁰⁰ | -1.06085×10⁺⁰⁰ |
| A(4) | 0.64628299 | 0.000000 | 2.19120×10⁻⁰¹ | -1.44440×10⁺⁰⁰ | -8.15307×10⁺⁰⁰ | 9.12/2/21×10⁺⁰⁰ |
| A(5) | -0.84082989 | 0.000000 | 3.04883×10⁻⁰¹ | 1.06727×10⁺⁰⁰ | 3.44776×10⁺⁰⁰ | 2.35909×10⁺⁰¹ |

FIG. 6

COMPACT WIDE-FIELD-OF-VIEW IMAGING OPTICAL SYSTEM

This invention relates to an optical system and, more particularly, to a refractive optical system that forms an image over a wide field of view.

BACKGROUND OF THE INVENTION

An imaging sensor system utilizes an imaging optical system to gather light rays from an external scene and focus them to form an image at an image surface. A detector is usually located at the image surface. In order to image under low-light conditions, it is desirable that the aperture of the imaging optical system be large. It is also desirable for some applications that the imaging optical system have a wide field of view. The imaging optical system preferably forms a planar image across its entire large-aperture, wide-field-of-view image surface, so that a planar detector such as a focal plane array detector may be employed at the image surface.

These capabilities are usually achieved with an imaging optical system whose overall length is at least two times, and in most cases three times or more, its effective focal length. Such an imaging optical system is operable, but it is long and bulky. For some applications such as uncooled infrared imaging sensor systems, it is necessary that the imaging optical system be relatively short and compact, with a ratio of the overall length to the effective focal length of less than 2, and preferably about 1.5 or less, in order to reduce the size and weight of the imaging optical system.

When a conventional optical system meeting the requirements of a large aperture and a wide field of view is shortened in this manner, the image surface becomes curved. If a curved detector is available and is fitted to the shape of the image surface, this approach is satisfactory. However, in most cases it is desirable to use a planar detector such as a focal-plane-array (FPA) detector. At the present time, generally curved focal-plane-array detectors are not available.

There is a need for an improved approach to imaging optical systems to provide large aperture size, wide field of view, and a compact length in a single apparatus. The present invention fulfills this need, and further provides related advantages.

SUMMARY OF THE INVENTION

The present invention provides an imaging optical system that may be produced in a large-aperture, wide-field-of-view, compact form. The imaging optical system gathers light rays from an external scene and focuses them to form an image at an image surface. Significantly, such an optical system may have a flat image surface. The optical system is therefore well suited for use in imaging sensor systems that use a flat detector, such as a focal-plane-array (FPA) detector, placed at the image surface.

In accordance with the invention, an imaging optical system has an optical axis and comprises a refractive optical group including a lens lying on the optical axis. (The lenses discussed herein are all powered lenses.) At least one lens of the optical group lying on the optical axis has an aspheric front surface and an aspheric back surface. There is an image surface lying on the optical axis, and the refractive optical group forms an image at the image surface. Preferably, the image surface is substantially planar.

In the usual practice, there is also a detector lying on the optical axis at the image surface, positioned such that a ray of light passing through the lens is incident upon the detector. Where the image is substantially planar, the detector may be a planar focal-plane-array detector. The detector may be operable with any wavelength or wavelength range of interest, such as a visible-light detector, an infrared detector, or an infrared detector sensitive to a particular wavelength range.

The front surface and the back surface of the lens are aspheric. The front surface and the back surface may be of the same aspheric shape or different aspheric shapes. They front surface and the back surface may be general-form aspheric surfaces. They may instead be special-form aspheric surfaces such as conic surfaces or spline surfaces.

More preferably, the refractive optical group comprises two lenses arranged along the optical axis. Each lens has an aspheric front surface and an aspheric back surface. Each of the two lenses may be a double concave lens, where the front surface and the back surface of each lens are each concave relative to the image surface. Preferably in that embodiment, each of the first lens and the second lens is a double concave lens that is concavely curved relative to the image surface. There may additionally be a third lens in the refractive optical group having a third-lens front surface and a third-lens back surface, each preferably convexly curved relative to the image surface. In a particularly preferred design, the imaging optical system has a large aperture with an F number of less than about F/1.5, a field of view of more than about 45 degrees, and a telephoto ratio of less than about 2.0. The telephoto ratio is the ratio of the overall length of the imaging optical system to the effective focal length. The telephoto ratio is desirably small so that the imaging optical system is compact.

In the embodiment having two (or more) lenses, the first lens and the second lens are preferably defined according to a relation, applied on a point-by-point basis across the field of view, $\phi_t = \phi_1 + \phi_2 - (d\phi_1\phi_2)$, wherein $\phi_t$ is the total local optical power, $\phi_1$ is the local optical power of the first lens, $\phi_2$ is the local optical power of the second lens, and d is the local spacing between the first lens and the second lens. This embodiment produces the planar image surface.

The present imaging optical system uses doubly-aspheric lenses. The shape of the surface of each lens of the refractive optical group is tailored as a function of location on the surface so that the light rays passing through that location have a desired imaging characteristic. The preferred imaging characteristic is, for all of the rays from the imaged scene, to focus substantially on a single planar imaging plane, within specified tolerances. With increasing field of view, increasing aperture size (decreasing F number), and decreasing telephoto ratio, achieving this planar imaging plane becomes increasingly difficult. However, using available computational techniques for determining the shape of each surface, optimally shaped surfaces for the lenses may be calculated. The use of aspheric surfaces and a sufficient number of lenses provides a sufficiently large number of variables to achieve focusing at a flat image surface, within normal optical limits, for large fields of view, large aperture sizes, and telephoto ratios below about 2.0.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIGS. 5–6 present an optical prescription for a preferred three-lens imaging optical system of FIG. 2, with FIG. 5 stating the design parameters and FIG. 6 setting forth values (according to the general form aspheric equation of paragraph [0023]) defined in FIG. 5.

DETAILED DESCRIPTION OF THE INVENTION

Figure 1:
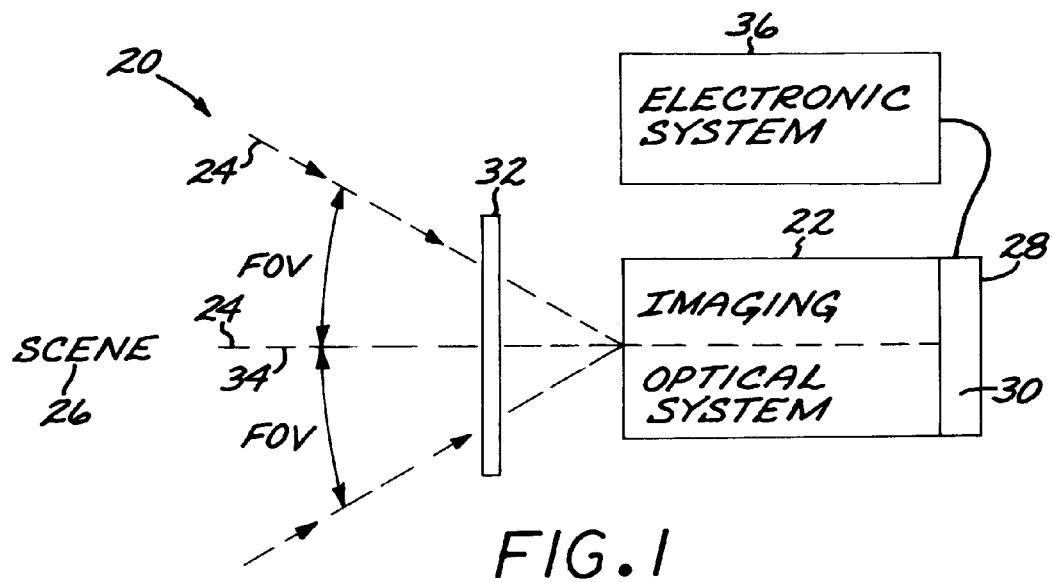
FIG. 1 is a schematic view of an imaging sensor system using an imaging optical system.

FIG. 1 depicts an imaging sensor system 20. The imaging sensor system 20 uses an imaging optical system 22 to image light rays 24 from a scene 26 onto an image surface 28, which is preferably planar. A detector 30 is typically located at the image surface 28. The detector 30 is preferably a focal-plane-array (FPA) detector. FPA detectors and their fabrication technique, for both visible and infrared wavelengths, are known in the art for other applications and may be 25 used in the imaging sensor system 22. The light rays 24 may pass through an optional window 32 before entering the imaging optical system 22. An optical axis 34 provides an angular reference line for the imaging sensor system 20. The imaging optical system 22, the image surface 28, and the detector 30 all lie on the optical axis 34.

In most cases, the optical axis 34 is an axis of rotational symmetry of the imaging optical system 22. The optical axis 34 may be folded or otherwise intentionally nonlinear. The imaging sensor system 20 may contain other optical elements in addition to those of the imaging optical system 22, such as, for example, mirrors, image intensifiers, color processing elements, and the like. A field of view (FOV) of the optical system 22 is the maximum angle, measured from the optical axis outwardly, of light rays 24 that are imaged. The FOV is usually symmetric about the optical axis 34. The detector 30 converts the incident light rays 24 into electrical signals, which are analyzed by an electronic system 36. Suitable electronic systems 36 are known in the art in conjunction with each type of detector 30.

Figure 2:
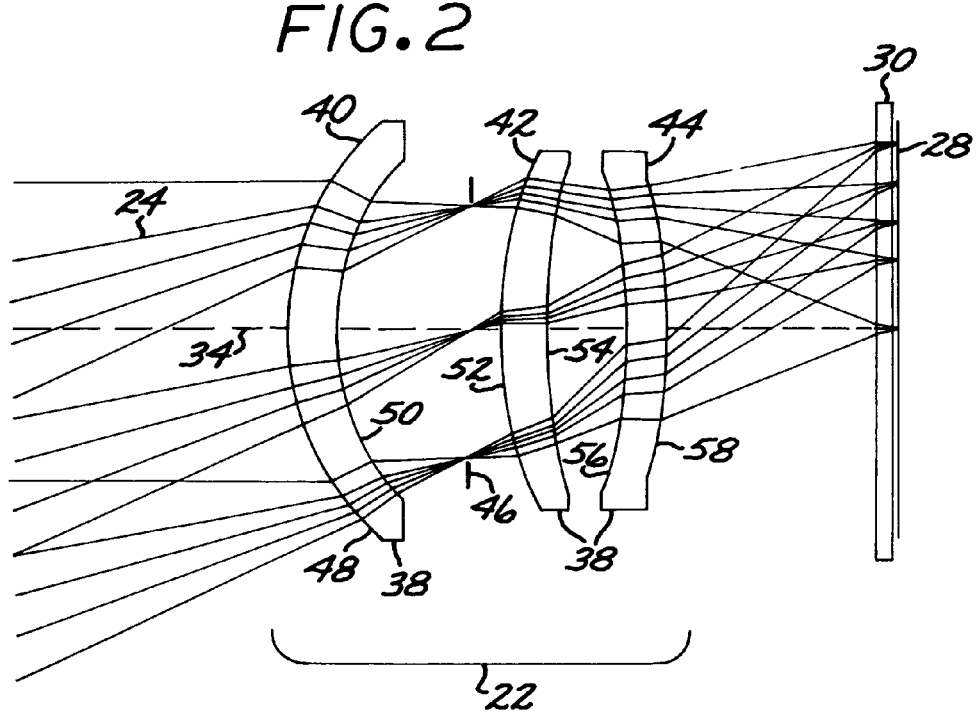
FIG. 2 is a schematic sectional view of a preferred form of the imaging optical system and imaging detector of FIG. 1, with ray paths indicated.

FIG. 2 depicts a preferred embodiment of the imaging optical system 22 and its relation to the detector 30 in greater detail. The imaging optical system 22 contains a refractive optical group 38 lying along the optical axis 34 so that the light rays 24 pass through the refractive optical group 38. The refractive optical group 38 has at least one powered lens 40 lying on the optical axis 34, preferably at least two powered lenses 40 and 42 lying on the optical axis 34, and most preferably exactly three powered lenses 40, 42, and 44 lying on the optical axis 34. ("Exactly" as used herein means the specified number of lenses, no more and no less.) The most-preferred three-lens embodiment is illustrated. Additionally, there is typically an aperture 46 at a location in front of the refractive optical group 38 (that is, further from the image surface 28 than is the refractive optical group 38), between two of the lenses of the refractive optical group 38, or behind the refractive optical group 38 (that is, closer to the image surface 28 than is the refractive optical group 38). In FIG. 2, the aperture 46 is illustrated between two of the lenses, here the lenses 40 and 42. The refractive optical group 38 may contain more than three lenses 40, 42, and 44. However, because the lenses must be spaced apart along the optical axis 34, the addition of more lenses has the effect of lengthening the imaging optical system 22, which is highly undesirable for many applications.

The first lens 40 (that is, the lens which light rays 24 from the scene 26 enter first and which is the furthest lens from the image surface 28) has a first-lens front surface 48 and a first-lens back surface 50. ("Front surface" as used herein refers to the surface of the lens facing toward the scene 26 and away from the image surface 28, and "back surface" refers to the surface of the lens facing away from the scene 26 and toward the image surface 28.) The second lens 42 has a second-lens front surface 52 and a second-lens back surface 54. The third lens 44, which is the closest lens to the image surface 28 and is positioned such that the second lens 42 lies between the first lens 40 and the third lens 44, has a third-lens front surface 56 and a third-lens back surface 58. Both the front surface and the back surface of at least one of the lenses 40, 42, 44 are aspheric. Preferably, the front surface and the back surface of at least two of the lenses 40, 42, 44 are aspheric. Most preferably, the front surface and the back surface of all three of the lenses 40, 42, 44 are aspheric. The front surfaces and the back surface of each lens 40, 42, and 44 may be the same aspheric shape, but more generally and preferably they are of different aspheric shapes.

As used herein, an "aspheric" surface shape z is described mathematically by the relation $$z = ch^2/\{1+[1-(1+k)c^2h^2]^{1/2}\} + Ah^4 + Bh^6 + Ch^8 + Dh^{10} +$$

plus a continuing series of higher order terms of the form (constant)$h^{2n}$ if and as appropriate. The value z is the sag of the surface parallel to the z-axis, $h^2=x^2+y^2$, x and y are Cartesian coordinates in a plane perpendicular to the z-axis (which is coincident with the optical axis 34), c is the curvature at the pole of the surface, k is the conic coefficient, and A, B, C, and D are constants. Each of the surfaces 48, 50, 52, 54, 56, and 58, where aspheric as in the preferred case, may be general form aspheric surfaces, or they may be special form aspheric surfaces such as conic surfaces or spline surfaces.

In the embodiment illustrated in FIG. 2, each of the first lens 40 and the second lens 42 is a double concave lens. That is, the first-lens front surface 48 and the first-lens back surface 50, and the second-lens front surface 52 and the second-lens back surface 54 of the second lens 42, are all aspheric and concavely curved relative to the image surface 28. That is, they bulge away from the image surface 28 as illustrated. The third-lens front surface 56 and the third-lens back surface are each aspheric and convexly curved relative to the image surface 28. That is, they bulge toward the image surface 28.

The present approach offers a great deal of flexibility in the selection of the aspheric shapes of the aspheric lenses to achieve particular design objectives in regard to the nature of the image, and in particular in regard to the shape of the image surface 28. Most preferably, the image surface 28 is planar and lies perpendicular to the optical axis 34, so that the detector 30 positioned at the image surface 34 may be planar and specifically a focal plane array detector.

Figure 3:
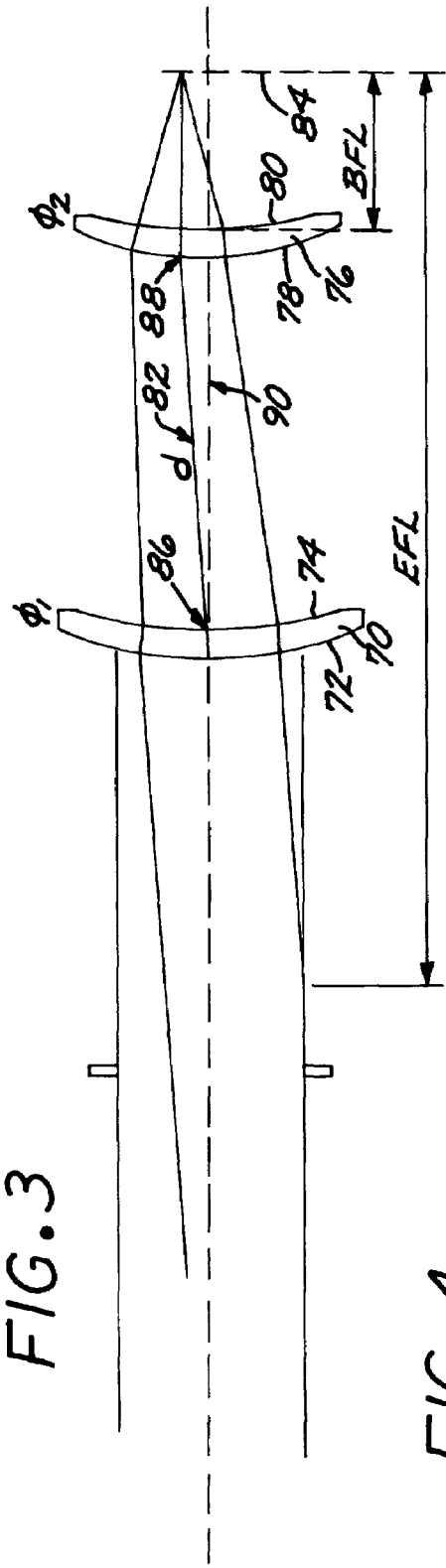
FIG. 3 is a schematic drawing illustrating two lenses of an imaging optical system and the design approach used herein.

To design the shape of the surfaces 48, 50, 52, 54, 56, and 58 of the lenses 40, 42, and 44, the principles illustrated in FIG. 3 are applied in a point-by-point manner across each of the surfaces of the lenses, relative to the adjacent surface of the adjacent lens, to determine the surfaces. FIG. 3 presents an illustrative example. In this depiction, a first lens 70 has a first-lens front surface 72 and a first-lens back surface 74. A second lens 76 has a second-lens front surface 78 and a second-lens back surface 80. Light rays 82 are focused on an image surface 84 with an effective focal length EFL and a back focal length BFL. The first lens 70 has a local (that is, at a first point 86 on the first-lens back surface 74) optical focal power $\phi_1$, and the second lens 72 has a local (that is, at a second point 88 on the second-lens front surface 78) optical focal power $\phi_2$. The first point 86 on the first-lens back surface 74 and the second point 88 on the second-lens front surface 78 are separated by a local distance d.

In this analysis, a total local optical power $\phi_t$ of the two lenses 70 and 76 and the effective focal length and back focal length are $$\phi_t = \phi_1 + \phi_2 - (d\phi_1\phi_2) = 1/EFL, \text{ and } BFL = (1-\phi_1 d)/\phi_t.$$

This relation may be applied for light rays coming from the scene on a point-by-point basis across the entire field of view, for multiple angles and multiple rays. In most cases, all of the lenses are axially symmetric about the optical axis 90, so that the shape of each surface is a function only of the distance from the optical axis 90. The total optical power and the back focal length to the image surface 84 are selected on a point-by-point basis to produce a planar image surface 84. The aspheric forms of the surfaces 72, 74, 78, and 80, and the distance d, provide sufficient variables to achieve a planar image surface 84 within conventional tolerances.

FIG. 3 illustrated the principles as applied to two lenses. If the use of two lenses is not sufficient to permit the image surface 84 to be planar, a third lens may be added as in FIG. 2. A computational approach, described subsequently, has established that the three-lens configuration is preferred to achieve a desired set of optical parameters of most interest. If a fourth lens were added to the configuration of FIG. 2, the image surface 84 could be made even closer to planar. However, a fourth lens would add a significant amount to the overall length.

Figure 4:
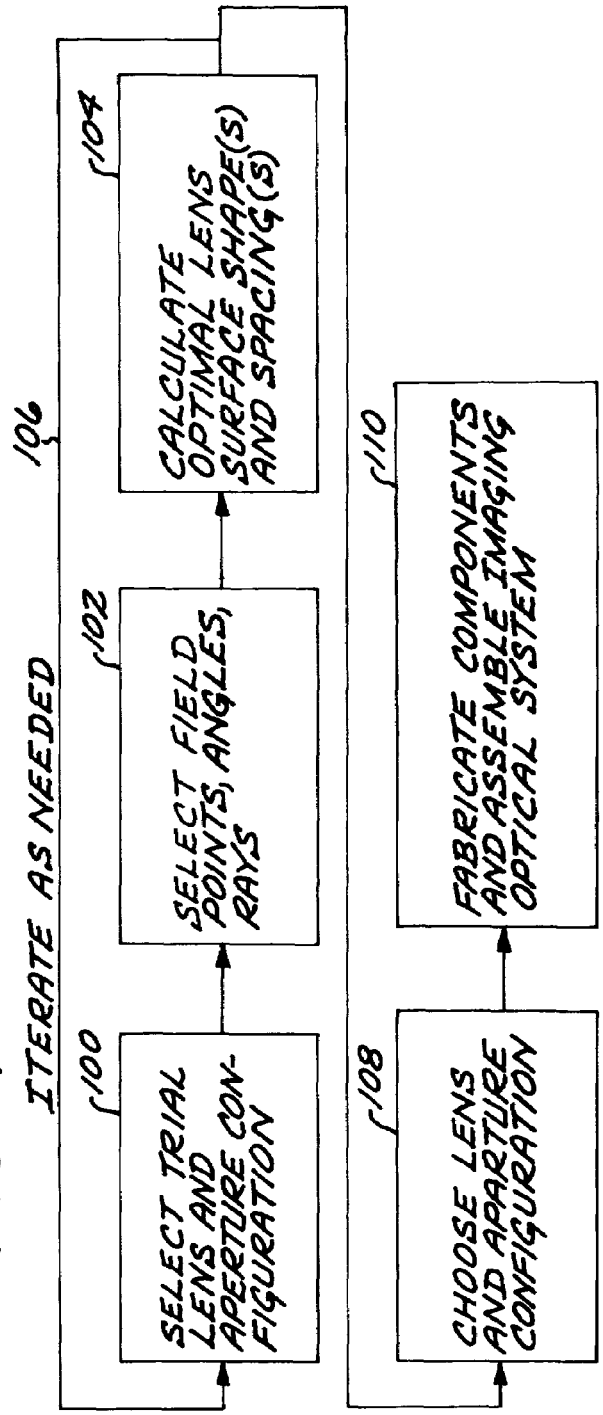
FIG. 4 is a block diagram of a preferred approach for designing and fabricating the imaging optical system of FIG. 2.

FIG. 4 illustrates a preferred technique for designing an imaging optical system according to the present approach. A trial lens and aperture configuration for the imaging optical system is first selected, step 100. That is, the number, general shapes, and spacings of the lenses, and the location and size of the aperture, are first selected for a first trial imaging optical system. An array of field points across the surfaces of the lenses (that is, as a function of radius from the optical axis in the axially symmetric case) is selected, an array of incident angles of the light rays is selected, and an array of ray paths is selected, step 102. The optimal shapes and spacings of the surfaces of the lenses are calculated using a known optics lens optimization computational method such as a damped least squares method, step 104. Any operable optics design software may be used in this analytical process.

If the result does not achieve a planar image surface (or other desired form) to within the required tolerances, the steps 100, 102, and 104 may be repeated as needed, step 106, with a new set of imaging optical system parameters selected in step 100. The new set of imaging optical system parameters can usually be based upon those of the prior iteration, eventually reaching the optimized design.

When the required form is achieved to within the required tolerances, that lens and aperture configuration, and the computed surface shapes, are chosen, step 108. The components, including the lenses and aperture and any other required optical elements, are fabricated and assembled, step 110. The surfaces of the lenses may be fabricated by a technique such as numerically controlled diamond point turning of a blank, or casting to shape in some cases.

A large-aperture, large-field-of-view, small-telephoto-ratio imaging optical system is not possible with conventional approaches. The telephoto ratio is the ratio of the overall length of the imaging optical system to the effective focal length, which is desirably small so that the imaging optical system is compact. Specifically, it is not possible to prepare the imaging optical system with an F number of less than about F/1.5, a field of view of more than about 45 degrees, and a telephoto ratio of less than about 2.0 using conventional approaches. Such imaging optical systems may be designed and fabricated using the present approach. The present approach may be used to design and fabricate less-demanding optical systems as well, but in many cases the fabrication complexity of aspheric lenses will mandate the use of simpler-shaped lenses for less-demanding optical systems.

FIG. 5 presents the design parameters for a three-lens imaging optical system as shown generally in FIG. 2, with an F number of F/1.4, a field of view of 50 degrees, an overall length of 1.502 inches, an effective focal length EFL of 1.0 inch, and a telephoto ratio of 1.503, computed with the approach of FIG. 4. Values for the aspheric parameters are presented in FIG. 6, in the terms of the general aspheric equation of paragraph [0023]. In FIG. 5, positive radius indicates that the center of curvature is to the right, and a negative radius indicates that the center of curvature is to the left. Dimensions are given in inches. The "thickness" is the axial distance to the next surface. Image diameters are paraxial values, not determined by ray tracing. The glass used in the lenses has an index of refraction of 4.0031 for the wavelength of 12 micrometers, and the calculations are performed for a spectral range of 8–12 micrometers, in the infrared.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An imaging optical system having an optical axis and comprising
   a refractive optical group including a lens lying on the optical axis, wherein at least one lens lying on the optical axis has an aspheric front surface and an aspheric back surface; and
   an image surface lying on the optical axis, wherein the refractive optical group forms an image at the image surface, wherein the imaging optical system has an F number of less than about F/1.5, a field of view of more than about 45 degrees, and a telephoto ratio of less than about 2.0.

2. The imaging optical system of claim 1, wherein the image surface is substantially planar.

3. The imaging optical system of claim 1, wherein the front surface and the back surface of the lens are each a conic surface.

4. The imaging optical system of claim 1, further including
   a detector lying on the optical axis at the image surface, such that a ray of light passing through the lens is incident upon the detector.

5. The imaging optical system of claim 4, wherein the detector is a focal plane array detector.

6. The imaging optical system of claim 4, wherein the detector is an infrared detector.

7. The imaging optical system of claim 1, wherein the refractive optical group comprises two lenses arranged along the optical axis, and wherein each lens has an aspheric front surface and an aspheric back surface.

8. The imaging optical system of claim 7, wherein each of the two lenses is a double concave lens.

9. The imaging optical system of claim 7, wherein each of the first lens and the second lens is a double concave lens that is concavely curved relative to the image surface.

10. The imaging optical system of claim 1, wherein the front surface and the back surface of the lens are each a spline surface.

11. An imaging optical system having an optical axis and comprising
a refractive optical group comprising
a first lens lying on the optical axis and having an aspheric first-lens front surface and an aspheric first-lens back surface, and
a second lens lying on the optical axis and having an aspheric second-lens front surface and an aspheric second-lens back surface, wherein the first lens and the second lens are defined according to a relation, applied on a point-by-point basis across the field of view:

$\phi_t = \phi_1 + \phi_2 - (d\phi_1 \phi_2)$ wherein $\phi_t$ is the total local optical power, $\phi_1$ is the local optical power of the first lens, $\phi_2$ is the local optical power of the second lens, and d is the local spacing between the first lens and the second lens; and
a substantially planar image surface lying on the optical axis, wherein the refractive optical group forms an image at the image surface.

12. The imaging optical system of claim 11, further including a detector lying on the optical axis at the image surface.

13. The imaging optical system of claim 12, wherein the detector is an infrared focal plane detector.

14. The imaging optical system of claim 11, wherein each of the first lens and the second lens is a double concave lens.

15. The imaging optical system of claim 11, further including
a third lens lying on the optical axis, with the second lens lying between the first lens and the third lens along the optical axis.

16. The imaging optical system of claim 11, wherein the imaging optical system comprises exactly three powered lenses, including
the first lens having the first-lens front surface and the first-lens back surface each concavely curved relative to the image surface,
the second lens having the second-lens front surface and the second-lens back surface each concavely curved relative to the image surface, and
a third lens having a third-lens front surface and a third-lens back surface each convexly curved relative to the image surface.

17. The imaging optical system of claim 11, wherein the imaging optical system has a telephoto ratio of less than about 2.0.

18. An imaging optical system having an optical axis and comprising
a refractive optical group comprising
a first lens lying on the optical axis and having an aspheric first-lens front surface and an aspheric first-lens back surface, and
a second lens lying on the optical axis and having an aspheric second-lens front surface and an aspheric second-lens back surface; and
a substantially planar image surface lying on the optical axis, wherein the refractive optical group forms an image at the image surface, wherein the imaging optical system has an F number of less than about F/1.5, a field of view of more than about 45 degrees, and a telephoto ratio of less than about 2.0.

19. An imaging optical system having an optical axis and a substantially planar image surface, the imaging optical system comprising
a refractive optical group having exactly three powered lenses which form a substantially planar image at the substantially planar image surface, wherein the refractive optical group includes
a double concave aspheric first lens having a first-lens front surface and a first-lens back surface each concavely curved relative to the image surface,
a double concave aspheric second lens having a second-lens front surface and a second-lens back surface each concavely curved relative to the image surface, and
a double convex third lens having a third-lens front surface and a third-lens back surface each convexly curved relative to the image surface, wherein the first lens is furthest from the image surface of the three powered lenses, the third lens is closest to the image surface of the three powered lenses, and the second lens lies between the first lens and the third lens; and
an infrared focal plane detector lying on the optical axis at the substantially planar image surface.

20. The imaging optical system of claim 19, wherein the refractive optical group has exactly three powered lenses.

21. An imaging optical system having an optical axis and a substantially planar image surface, the imaging optical system comprising
a refractive optical group having exactly three powered lenses which form a substantially planar image at the substantially planar image surface, wherein the refractive optical group includes
a double concave aspheric first lens having a first-lens front surface and a first-lens back surface each concavely curved relative to the image surface,
a double concave aspheric second lens having a second-lens front surface and a second-lens back surface each concavely curved relative to the image surface, and
a double convex third lens having a third-lens front surface and a third-lens back surface each convexly curved relative to the image surface; and
an infrared focal plane detector lying on the optical axis at the substantially planar image surface, wherein the imaging optical system has an F number of less than about F/1.5, a field of view of more than about 45 degrees, and a telephoto ratio of less than about 2.0.

* * * * *